United States Patent
Hiraishi et al.

(10) Patent No.: US 7,493,882 B2
(45) Date of Patent: Feb. 24, 2009

(54) COMBINATION OF A CYLINDER LINER AND A PISTON RING

(75) Inventors: Iwao Hiraishi, Saitama (JP); Katsuaki Ogawa, Saitama (JP); Hiromi Ishikawa, Saitama (JP); Tsugane Hirase, Saitama (JP); Kazuhiro Sameshima, Saitama (JP)

(73) Assignee: Nippon Piston Ring Co., Ltd., Saitama-Shi (JP)

( * ) Notice: Subject to any disclaimer, the term of this patent is extended or adjusted under 35 U.S.C. 154(b) by 15 days.

(21) Appl. No.: 11/847,442

(22) Filed: Aug. 30, 2007

(65) Prior Publication Data

US 2008/0053396 A1 Mar. 6, 2008

(30) Foreign Application Priority Data

Aug. 31, 2006 (JP) ............................. 2006-236974

(51) Int. Cl.
*F02F 5/00* (2006.01)
(52) U.S. Cl. ............... 123/193.6; 123/193.4; 123/193.2
(58) Field of Classification Search ... 123/193.1–193.6; 148/437, 523; 420/534

See application file for complete search history.

(56) References Cited

U.S. PATENT DOCUMENTS

| 4,938,810 | A | * | 7/1990 | Kiyota et al. | ............... 148/437 |
| 5,019,178 | A | * | 5/1991 | Barlow et al. | ............... 420/534 |
| 5,891,273 | A | * | 4/1999 | Ruckert et al. | ............... 148/523 |
| 2003/0192501 | A1 | * | 10/2003 | Ishikawa et al. | ......... 123/193.2 |
| 2004/0040631 | A1 | * | 3/2004 | Takahashi et al. | ........... 148/226 |

FOREIGN PATENT DOCUMENTS

| JP | 63-38567 | 2/1988 |
| JP | 3-267549 | 11/1991 |
| JP | 4-76251 | 3/1992 |
| JP | 9-19757 | 1/1997 |
| JP | 11-287326 | 10/1999 |

* cited by examiner

*Primary Examiner*—M. McMahon
(74) *Attorney, Agent, or Firm*—Young & Thompson

(57) ABSTRACT

A combination of a cylinder liner and a piston ring, wherein the cylinder liner includes, silicon: 23.0-28.0% by weight, magnesium: 0.80-2.0% by weight, copper: 3.0-4.5% by weight, iron: 0.25% by weight or less, nickel: 0.01% by weight or less, wherein surface roughness profile of the inner circumference surface has Rz=0.5 to 1.0 μm, Rk=0.2 to 0.4 μm, Rpk=0.05 to 0.1 μm, Rvk=0.08 to 0.2 μm, wherein the piston ring includes carbon: 0.6-0.7% by weight, chrome: 13-14% by weight, molybdenum: 0.2-0.4% by weight, silicon: 0.25-0.50% by weight, manganese: 0.2-0.5% by weight, and wherein carbides with the diameter of 5.0 μm and less are 4-10%.

4 Claims, 1 Drawing Sheet

COMBINATION OF A CYLINDER LINER AND A PISTON RING

BACKGROUND OF THE INVENTION

1. Field of the Invention

The present invention relates to a combination of a cylinder liner and a piston ring, more particularly, to a combination of a cylinder liner used for an internal-combustion engine for automobiles, lawn mowers, generators, etc. and a piston ring which slides on an inner circumference surface of such cylinder liner.

2. Related Art

In recent years, in order to improve fuel economy and kinematic performance, a reduction in weight of a whole automobile has been promoted, and, with such reduction in weight or a whole automobile, it is natural that the engine has also become a target of the reduction in weight.

In order to try to reduce the weight of an engine, it has been developed to use light alloy typified by magnesium alloy or aluminum alloy for a cylinder liner and a cylinder block which is cast so as to envelope the cylinder liner. As an illustrative embodiment of these cylinder liners and cylinder blocks, for example, Patent Literatures 1 to 5 can be mentioned.

In Patent Literatures 1 to 3, a cylinder liner formed of aluminum alloy using fiber-reinforced materials and a cylinder block made of aluminum alloy which was cast so as to envelope the cylinder liner are disclosed. In addition, in Patent Literature 4, a cylinder liner made of hypereutectic aluminum-silicon alloy and a cylinder block made of aluminum alloy which was cast so as to envelope the cylinder liner are disclosed.

On the other hand, as to a piston ring sliding on an inner circumference surface of a cylinder liner, in order to achieve the object of the reduction in weight of the engine, a further development has been also undertaken besides above-mentioned various kinds of cylinder liners.

For example, in Patent Literature 5, a piston ring for combining with a cylinder liner disclosed in the Patent Literature 4 is disclosed.

[Patent Literature 1] Japanese Patent Unexamined Patent Publication No. S63-038567 (JPS63-038567A)
[Patent Literature 2] Japanese Patent Unexamined Patent Publication No. H03-267549 (JPH03-267549A)
[Patent Literature 3] Japanese Patent Unexamined Patent Publication No. H04-076251 (JPH04-076251A)
[Patent Literature 4] Japanese Patent Unexamined Patent Publication No. H09-019757 (JPH09-019757A)
[Patent Literature 5] Japanese Patent Unexamined Patent Publication No. H11-287326 (JPH11-287326A)

However, sufficient performance cannot be obtained from the combination of the cylinder liner and the piston ring disclosed in Patent Literature 5, and thus there is still room for further improvement.

Specifically, for example, in recent years there has been a movement to reduce the frictional force between a cylinder liner and a piston ring for the purpose of improving fuel economy, and it is considered to reduce a tension rate (N/m) obtained by dividing the total tension of the piston rings by a bore diameter. However, the combination of the cylinder liner and the piston ring disclosed in Patent Literature 5 does not consider this point and it is far from obtaining the sufficient performance.

In addition, as for the cylinder liner disclosed in Patent Literature 4, a sufficient performance is not obtained. For example, as for such cylinder liner, there was a problem that the frictional force with a piston ring increases when a difference in level between silicon primary crystal or intermetallic compound such as $Al_2Cu$ or $Mg_2Si$ and Al alloy as a base material, and a corner edge of these compounds which extends to the sliding surface base side, which are caused by chemical polishing (etching), slides with the piston ring. In addition, when the tension of the piston ring is relatively large as in an oil ring (about 10 times as much as a pressure ring), the wear resistance of the ring and the aggressiveness to the cylinder liner sometimes became a problem.

Furthermore, not limited to the above-mentioned Patent Literatures 1 to 5, there have been many cases where a cylinder liner and a piston ring are developed separately, and it has not been considered to settle, with a total power of the cylinder liner and the piston ring, low friction properties with the cylinder liner and the piston ring as well as the reduction in weight of a whole engine and also the reduction of each other's amount of wear.

SUMMARY OF THE INVENTION

The present invention was made under such circumstances and it can meet the requirement for the reduction in weight of the current engine. A main problem to be solved by the present invention is to provide these optimal combinations which make low friction between a cylinder liner and a piston ring and the reduction of each other's amount of wear possible, and make it possible to try to improve scuffing resistance.

As a result of our diligent study to solve the above-mentioned problem, we, the present inventors have found out the things to determine various parameters such as each composition and surface roughness, under considering the contact pressure of a cylinder liner and a piston ring, and finally developed the present invention.

That is to say, a first invention concerned to solve the above-mentioned problem is a combination of a cylinder liner used for an internal-combustion engine and a piston ring which slides on an inner circumference surface of the cylinder liner at the pressure of 0.03 to 0.2 MPa, wherein the composition of the cylinder liner comprises, (Composition A) silicon: 23.0 to 28.0% by weight, magnesium: 0.80 to 2.0% by weight, copper: 3.0 to 4.5% by weight, iron: 0.25% by weight or less, nickel: 0.01% by weight or less, and the rest: unavoidable impurities and aluminum, or (Composition B) silicon: 23.0 to 28.0% by weight, magnesium: 0.80 to 2.0% by weight, copper: 3.0 to 4.5% by weight, iron: 1.0 to 1.4% by weight, nickel: 1.0 to 5.0% by weight, and the rest: any of avoidable impurities and aluminum; wherein surface roughness profile of the inner circumference surface of the cylinder liner has, a ten-point average roughness Rz=0.5 to 1.0 μm according to JIS B 0601 (1994), an core roughness depth (i.e., effective loading roughness) Rk=0.2 to 0.4 μm according to DIN4776 standards, a reduced peak height (i.e., initial abrasion height) Rpk=0.05 to 0.1 μm according to DIN 4776, a reduced valley depth (i.e., oil retention groove depth) Rvk=0.08 to 0.2 according to DIN 4776; meanwhile, wherein the composition of the piston ring comprises carbon: 0.6 to 0.7% by weight, chrome: 13 to 14% by weight, molybdenum: 0.2 to 0.4% by weight, silicon: 0.25 to 0.50% by weight, manganese: 0.2 to 0.5% by weight, and the rest: unavoidable impurities and iron; and the composition includes carbides with a diameter of 5.0 μm or less at the area rate of 4 to 10%, and the surface roughness profile of an outer circumference sliding surface of the piston ring has a ten-point average roughness Rz=0.8 μm or less according to JIS B 0601 (1994), and a reduced peak height Rpk=0.15 μm or less according to DIN 4776.

In addition, a second invention concerned to solve the above-mentioned problem is a combination of a cylinder liner used for an internal-combustion engine and a piston ring which slides on an inner circumference surface of the cylinder liner at the pressure of 0.2 to 1.2 MPa, wherein the composition of the cylinder liner comprises, (Composition A) silicon: 23.0 to 28.0% by weight, magnesium: 0.80 to 2.0% by weight, copper: 3.0 to 4.5% by weight, iron: 0.25% by weight or less, nickel: 0.01% by weight or less, and the rest: unavoidable impurities and aluminum, or (Composition B) silicon: 23.0 to 28.0% by weight, magnesium: 0.80 to 2.0% by weight, copper: 3.0 to 4.5% by weight, iron: 1.0 to 1.4% by weight, nickel: 1.0 to 5.0% by weight, and the rest: any of avoidable impurities and aluminum; wherein surface roughness profile of the inner circumference surface of the cylinder liner has, a ten-point average roughness Rz=0.5 to 1.0 μm according to JIS B 0601 (1994), an core roughness depth Rk=1.2 to 0.4 μm according to DIN 4776 standards, a reduced peak height Rpk=0.05 to 0.1 μm according to DIN 4776, a reduced valley depth Rvk=0.08 to 0.2; meanwhile, wherein the composition of the piston ring comprises carbon: 0.26 to 0.4% by weight, chrome: 12 to 14% by weight, nickel: 0.6% or less by weight, silicon: 1.0% or less by weight, manganese: 1.0% or less by weight, and the rest: unavoidable impurities and iron, and the composition includes carbides with a diameter of 5.0 m or less at the area rate of 4 to 10%, and the surface roughness profile of an outer circumference sliding surface of the piston ring has a ten-point average roughness Rz=0.8 μm or less according to JIS B 0601 (1994), and a reduced peak height Rpk=0.15 μm or less according to DIN 4776.

In addition, in the above-mentioned first and second inventions, a DLC (diamond-like carbon) coating may be formed on the outer circumference sliding surface of the piston ring.

According to a combination of a cylinder and a piston ring of the present invention, a composition of a piston ring is determined depending on a contact pressure of an inner circumference surface of the cylinder liner and a sliding piston ring, and furthermore, as both the cylinder liner and the piston ring are limited about the surface roughness using various parameters, it is possible to realize low friction, to reduce the amount of wear and improve the initial fitting and the scuffing resistance of both the cylinder liner and the piston ring.

Furthermore, in the present invention, the more effect can be produced by forming DLC coating on a surface of a piston ring.

EXPLANATION OF THE REFERENCE NUMERALS

Figure 1:
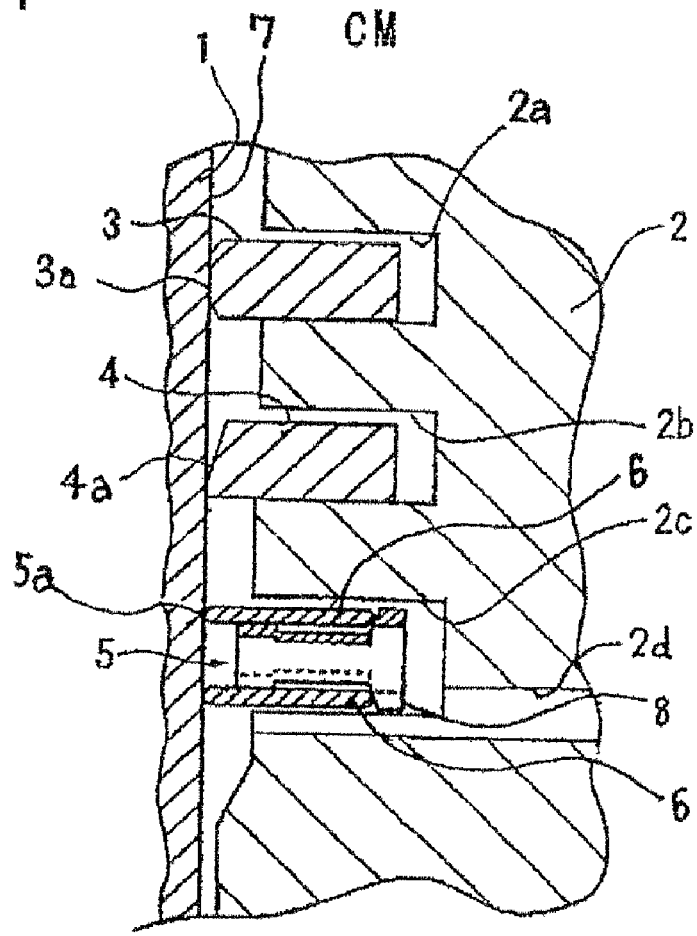
FIG. 1 is a schematic view showing a piston fitted with a piston ring and a cylinder liner.

| | |
|---|---|
| 1 | Cylinder liner |
| 2 | Piston |
| 3 | First pressure ring |
| 3a | Outer circumference sliding surface of a first pressure ring |
| 4 | Second pressure ring |
| 4a | Outer circumference sliding surface of a second pressure ring |

-continued

EXPLANATION OF THE REFERENCE NUMERALS

| | |
|---|---|
| 5 | 3-piece oil ring |
| 5a | Outer circumference sliding surface of a 3-piece oil ring |
| 6 | Side-rail |
| 7 | Inner circumference of a cylinder liner |
| 8 | Spacer expander |
| 9 | Amsler-type wear tester |
| 10, 11 | Specimen |
| 12 | Lubricant oil |
| P | Load |

DESCRIPTION OF THE PREFERRED EMBODIMENTS

A combination of a cylinder and a piston ring of the present invention (hereinafter sometimes referred to as only "combination") will be concretely described.

FIG. 1 is a schematic view of a piston fitted with a piston ring and a cylinder liner.

As shown in FIG. 1, annular piston-ring grooves 2a, 2b and 2c are formed on a piston 2 which reciprocates inside a cylinder 1, and a first pressure ring 3, a second pressure ring 4 and a 3-piece oil ring 5 are fitted to the piston-ring grooves 2a to 2c respectively in order of being closer to a combustion chamber CM, and slides in contact with a cylinder wall surface 1. The 3-piece oil ring 5 is composed of side-rails 6 and a spacer expander 8.

Furthermore, in a piston 2, a drain hole 2d is provided in order to circulate oil to a crankcase which is communicated with the piston-ring groove 2c fitted with an oil ring 1 and which does not shown in this figure.

On these piston rings, a first pressure ring sliding surface 3a, a second pressure ring sliding surface 4a, and an oil ring sliding surface 5a, which individually slide in contact with a cylinder liner 1, are formed.

The present invention relates to the combination of such cylinder liner 1 and such piston rings 3, 4 and 5.

<Cylinder Liner>

First of all, a cylinder liner which constitutes a part of the combination of the present invention will be described. Incidentally, the cylinder liner used in the present invention may be a cylinder liner described below regardless of the contact pressure between the cylinder liner and piston rings described hereinafter (Composition of the piston rings used in the present invention varies depending on the contact pressure).

(Composition of Cylinder Liner)

The cylinder liner in a combination of the present invention may be a hypereutectic aluminum-silicon alloy which is selected from the following two kinds of compositions (Composition A, Composition B).

(Composition A)
Silicon: 23.0 to 28.0% by weight
Magnesium: 0.80 to 2.0% by weight
Copper: 3.0 to 4.5% by weight
Iron: 0.25% by weight or less
Nickel: 0.01% by weight or less
The rest: unavoidable impurities and aluminum (Composition B)
Silicon: 23.0 to 28.0% by weight
Magnesium: 0.80 to 2.0% by weight
Copper: 3.0 to 4.5% by weight
Iron: 1.0 to 1.4% by weight
Nickel: 1.0 to 5.0% by weight
The rest: unavoidable impurities and aluminum Here, in either case of the (Composition A) or (Composition B), by including silicon (Si) in the range of 23 to 28% by weight, namely being in hypereutectic, a primary crystalline Si can be actively crystallized. If silicon is less than 23%, during the manufacturing process by spray forming, a crystallization of primary crystalline silicon progresses insufficiently, and $Mg_2Si$ cannot be formed sufficiently because the amount of Si to be reacted with magnesium (Mg) is insufficient. On the other hand, if silicon exceeds 28%, a workability of a product becomes worse during the manufacturing process by spray forming, and thus it is not desirable.

In either case of the (Composition A) or (Composition B), by including magnesium in the range of 0.8 to 2.0% by weight, an intermetallic compound with aluminum, copper and silicon is formed, and the strength of the alloy can be enhanced. If Mg is less than 0.8%, the amount for forming the intermetallic compound is insufficient. On the other hand, it exceeds 2.0%, toughness and fatigue strength become lower.

In addition, in either case of the (Composition A) or (Composition B), by including copper in the range of 3.0 to 4.5% by weight, $Al_2Cu$ can be deposited with aluminum and copper, and the remainder of copper forms a solid solution in an aluminum base. If copper is less than 3.0%, a sufficient fatigue strength effect cannot be expected and if it exceeds 4.5%, the amount of aluminum-copper alloy which is not form the solid solution in a mother phase of aluminum increases, and toughness and fatigue strength become lower.

In addition, in a case of the (Composition A), it is desirable to regulate the content of iron to be 0.25% or less in order to prevent shrinkage breaking, and with respect to nickel, it is desirable to be 0.01% by weight or less, because it has a protective effect against thermal shrinkage.

On the other hand, in case of the composition (Composition B), because iron has an effect to prevent seizing during spraying to die, etc., iron is added at the rate of 1.0 to 1.4% by weight. If it is less than 1.0%, the effect becomes insufficient. If it exceeds 1.4%, Fe crystallizes out as $FeAl_3$, etc., which is followed by a degression of strength, and thus it is not preferable.

In addition, in case of the composition (Composition B), because nickel has an effect to reduce the degree of shrinkage, and also improves the strength, it is added at the rate of 1.0 to 5.0% by weight. If it is less than 1.0%, such effects would not be expected. If it exceeds 5.0%, it is not desirable because thermal shock resistance becomes lower remarkably.

Further, in either case of the (Composition A) or (Composition B), unavoidable impurities such as Mn, Zn, Pb, Sn, or Cr, etc., and elements such as Ti, B and Be which are mixed inevitably into the alloy on a metal-fusing process are included in the composition.

(Surface Roughness of Inner Circumference Surface of Cylinder Liner)

In addition, the cylinder liner which constitutes a part of the combination of the present invention is composed of a hypereutectic aluminum-silicon alloy consisting of the above mentioned Composition A or Composition B, and furthermore, the surface roughness profile of the inner circumference (that is, a sliding surface with piston rings mentioned later) has the following parameters.

Ten-point average roughness (Rz)=0.5 to 1.0 μm
Core roughness depth (Rk) 0.2 to 0.4 μm
Reduced peak height (Rpk) 0.05 to 0.1 μm
Reduced valley depth (Rvk)=0.08 to 0.2 μm Incidentally, the ten-point average roughness (Rz) is determined in accordance with JIS (Japanese Industrial Standards) B 0601 (1994), and the core roughness depth, the reduced peak height and the reduced valley depth are determined in accordance with DIN (Deutsche Industrie Norm) 4776, individually.

Here, by setting the value of the ten-point average roughness to be 0.5 to 1.0 μm, the wear can be reduced. If it is less than 0.5 μm, the scuffing resistance becomes worse, while the aggressiveness to counterpart increases if the value exceeds 1.0 μm.

In addition, by setting the value of the core roughness depth (Rk) to be 0.2 to 0.4 μm, the sliding resistance can be reduced.

In addition, by setting the value of reduced peak height (Rpk) to be 0.05 to 0.1 μm, the scuffing resistance can be improved. If it is less than 0.05 μm, the initial fitting becomes worse, while the initial fitting and the aggressiveness to counterpart are adversely affected if the value exceeds 0.1 μm.

In addition, by setting the value of the reduced valley depth (Rvk) to be 0.08 to 0.2 μm, the scuffing resistance can be improved. If it is less than 0.08 μm, the scuffing resistance becomes worse, while the amount of oil consumption increases if it exceeds 0.2 μm, so it is not desirable.

Concerning a manufacturing method of a cylinder liner having such parameters, there is no limitation and it is possible to make an arbitrary selection. For example, it can be manufactured by preparing pulverized material consisting of the above-mentioned (Composition A) or (Composition B), applying so-called spray compression process to the material after melting the material, then subjecting it to drawing process, and hammering process, and being enveloped with an aluminum die-cast when casting it (that is, being enveloped with a cylinder block when casting the cylinder block), and thereafter honing the inner circumference of the cylinder liner produced in order to adjust the surface roughness of the inner circumference of the cylinder liner.

More specifically, it is as follows.

In order to prepare a preform by fusing a material for the cylinder liner which is composed of the above-mentioned (Composition A) and further to make it a cylindrical article, first, a preform having minute particles of silicon primary crystals and intermetallic compounds is formed by spray forming The preform is deformed to a half-finished tubular product by using an extruder, and, furthermore, the half-finished product is subjected to machining, etc., in order to obtain a cylinder.

The preform prepared by spray forming is formed so that the silicon primary crystals and the intermetallic compounds may be produced with the following particle sizes indicated by μm.

Silicon primary crystals are to be 2 to 15 μm (Aim: 4.0 to 10.0 μm) the intermetallic compound of aluminum and copper ($Al_2Cu$) is to be 0.1 to 5.0 μm (Aim: 0.8 to 1.8 μm), and an intermetallic compound of magnesium and silicon ($Mg_2Si$) is to be 2.0 to 10.0 μm (Aim: 2.5 to 4.5 μm).

The cylinder liner thus obtained is cast into a crankcase by an aluminum die-cast. An inner circumference of the cylinder liner is subjected to a roughing process and a finishing process with the following machine honing in order to obtain a cylinder liner with a desired roughness.

A roughing process is performed by honing so as to attain to a roughness Rz within the range of 1.0 to 2.0 μm. Although the kind of grindstone used herein is not specifically limited, but a grindstone of which the grain size is about 800 to 2000 may be used, and the grindstone is fixed to a honing head to perform the horning process.

A finishing process is performed to the inner circumference surface of the cylinder liner by using a grindstone in which ceramic abrasive grains having a grain size in the range of about 600 to 1200 are bound with a binder such as a resin bond. By this polishing process, the inner circumference surface is finished into a shape in which the ten-point average roughness Rz is 0.5 to 1.0 μm, the reduced peak height Rpk according to DIN 4776 is 0.05 to 0.1 μm, the core roughness depth Rk according to DIN 4776 is 0.2 to 0.4 μm and the reduced valley depth Rvk according to DIN 4776 is 0.08 to 0.2 μm.

Concerning the silicon primary crystals of 2 to 15 μm, the intermetallic compound of aluminum and copper of 0.1 to 5.0 μm and the intermetallic compound of magnesium and silicon of 2.0 to 10.0 μm, on a surface of a cylinder liner, it is desirable to produce a surface roughness precisely adjusted by the honing process, while wearing convex parts away so as to eliminate differences in level and removing edges of these silicon primary crystals and edges of the intermetallic compounds by the roughing process.

Furthermore, small convex parts are further worn away by the finishing process.

In order to make the roughness on the surface fine, it is desirable to cut the surface up to deep concave parts of the base material by the roughing process, and then performing the finishing process. When the ten-point average roughness Rz is set as 0.8 to 0.9 μm of an upper limit of roughness, a desired surface roughness can be obtained by reducing grinding in the roughing process and then going into the finishing process. As adjustments of the reduced peak height Rpk and the core roughness depth Rk, they can be attained by the kind of a finishing grindstone to be used and machining time. Reduced valley depth Rvk can be adjusted by the grinding level and machining time of the primary roughing process.

Further, the cylinder liner used in the combination according to the present invention has characteristics, as known from the ten-point average roughness Rz according to JIS B 0601 (1994) among the parameters, that the differences in level of the surface due to the silicon primary crystals or the intermetallic compounds are made smaller. By making the differences in level of the surface due to silicon primary crystals or the intermetallic compounds smaller, a frictional force against an after-mentioned piston rings can be made smaller and low friction can be realized.

Here, with respect to the method to make differences in level smaller and setting the ten-point average roughness Rz according to JIS B 0601 (1994) as 0.5 to 1.0 μm, for example, when the honing processing is executed, a method in which chemical polishing (etching) using a water solution containing NaOH dare not be done on the horning process can be mentioned, although the present invention is not specifically limited thereto. It is because aluminum base metal surface of a cylinder liner is scraped if the chemical polishing is done, and differences in level of the silicon primary crystals or intermetallic compounds and corner edges of these particles become sharpen, and the differences in level of the surface become large more for that, and thus, there is a possibility of bringing an adverse effect.

<Piston Ring>

Next, piston rings combined with the above-mentioned cylinder liner will be described.

In the present invention, as shown below, a composition of the piston ring is varied depending on a contact pressure between the above-mentioned cylinder liner and the piston ring.

(Composition at Contact Pressure: 0.03 to 0.2 Mpa)
Carbon: 0.6 to 0.7% by weight
Chrome: 13 to 14% by weight
Molybdenum: 0.2 to 0.4% by weight
Silicon: 0.25 to 0.50% by weight
Manganese: 0.2 to 0.5% by weight
The rest: unavoidable impurities and iron Here, by regulating the content of carbon 0.6% by weight or more, carbide grains which reacted with Chrome (Cr) and size of which is about 1 to 5 μm can be deposited. On the other hand, if it exceeds 0.7% by weight, primary carbide grains become coarsely and plate-like carbide grains are deposited, so the aggressiveness toward an inner circumference surface of an aluminum cylinder liner as the counterpart material and the wear increases.

In addition, if the content of chrome (Cr) is less than 13% by weight, scuffing resistance and wear resistance cannot be sufficiently attained when considering a balance with an amount of carbon. On the other hand, if it exceeds 14% by weight, the deposition of carbide increases, and thus aggressiveness toward the inner circumference surface of an aluminum cylinder liner as the counterpart material and the wear increases. Furthermore, workability at time of forming becomes worse.

In addition, as not only molybdenum (Mo) in itself forms a hard carbide by combining with carbon but also a part of molybdenum forms a solid solution in the chrome carbide, therefore, if it is less than 0.2% by weight, the formation of carbide is insufficient and wear resistance is not sufficiently satisfied. By containing 0.2% by weight or more of molybdenum, chrome carbide is reinforced, wear resistance can be improved and heat fatigue can be improved. However, if the content of molybdenum exceeds 0.4% by weight, it causes the increase of carbides, increases the amount of wear of an inner circumference surface of an aluminum cylinder liner, and workability and toughness are lowered.

Silicon (Si) is to be added as a deoxidizing agent, and can improve heat fatigue property, but workability is deteriorated if the content of silicon exceeds 0.50% by weight.

Manganese (Mn) is to be added as a deoxidizing agent as well as the silicon, and 0.2% by weight or more is required, but cold workability is lowered if the content of manganese exceeds 0.5% by weight.

In addition, as unavoidable impurities, particularly, phosphorus (P) and sulfur (S) are permissible.

(Composition at Contact Pressure: 0.2 to 1.2 MPa)
Carbon: 0.26 to 0.4% by weight
Chrome: 12 to 14% by weight
Nickel: 0.6% by weight or less
Silicon: 1.0% by weight or less
Manganese: 1.0% by weight or less
The rest: unavoidable impurities and iron Here, if the content of carbon (C) is less than 0.26% by weight, the formation of carbide is insufficient and wear resistance is not sufficiently satisfied. On the other hand, by setting the upper limit of the content as 0.4% by weight, the size of carbide grains can be regulated to be 0.05 to 2.0 μm and the aggressiveness toward the cylinder liner can be reduced.

In addition, if the content of chrome (Cr) is less than 12% by weight, scuffing resistance and wear resistance cannot be sufficiently attained when considering a balance with an amount of carbon. On the other hand, if it exceeds 14% by weight, the deposition of carbide increases, and thus aggressiveness toward the inner circumference surface of an aluminum cylinder liner as the counterpart material and the wear increases. Furthermore, workability at time of forming becomes worse.

In addition, nickel (Ni) is an element added to improve toughness, but workability is deteriorated if the content of nickel exceeds 0.6% by weight.

Silicon (Si) is to be added as a deoxidizing agent, and can improve heat fatigue property, but workability is deteriorated if the content of silicon exceeds 1.0% by weight.

In addition, manganese (Mn) is also to be added as a deoxidizing agent, and 0.2% by weight or more is required, but cold workability is lowered if the content of manganese exceeds 1.0% by weight.

Further, as unavoidable impurities, as in the case of the above-mentioned "Composition at contact pressure: 0.03 to 0.2 MPa", particularly, phosphorus (P) and sulfur (S) are permissible.

In the cylinder liner consisting of hypereutectic aluminum-silicon alloy with which the above-mentioned piston ring is combined, as mentioned above, roughness is fined in view of friction and wear. For example, in the case of a high contact pressure as being in combination with an oil ring, since it slides with a strong force locally, the surface of the cylinder liner is attacked by carbide of the piston ring or nitride changed from it by nitriding. On this occasion, it is desirable to reduce the carbide and make the carbide small-grained one with low aggressiveness. By combining a composition of a piston ring depending on the contact pressure between the cylinder liner and the piston rings, the effect can be produced.

(Carbide in Piston Ring)

As is clear from descriptions of the compositions as mentioned above, in any of each composition depending on the contact pressure, carbides are formed in the piston ring, and grain diameters of the carbides are in the range of 5.0 µm or less and the area ratio thereof is in the range of 4 to 10%.

Since iron is a major component and carbon (C) and chrome (Cr) is added, carbides exist in the alloy, but aggressiveness toward a cylinder liner will increase if the grain diameters of the carbides exceed 5.0 µm. For these reasons, it is desirable that the diameters are in the range of 0.05 to 2.0 µm, and more desirably, in the range of 0.1 to 1.0 µm.

In addition, with respect to the area ratio of the carbides, that is, the proportion of the surface of piston ring which the carbides accounts for, if it is less than 4%, the amount of carbide is small so that the amount of wear of the piston ring increases. On the other hand, if it exceeds 10%, the amount of carbide becomes large and the aggressiveness toward a cylinder liner becomes large. For these reasons, it is particularly desirable that the area ratio is in the range of 6 to 8%.

Incidentally, the area ratio for carbide in the present invention is a value determined by an image analysis device.

(Surface Roughness of Outer Circumference Sliding Surface of Piston Ring)

The surface roughness of an outer circumference sliding surface of a piston ring which is used for the combination of the present invention has the following parameters regardless of the contact pressure with a cylinder liner.

Ten-point average roughness (Rz)=0.8 µm or less

Reduced peak height (Rpk)=0.15 µm or less

Incidentally, the ten-point average roughness (Rz) is a value obtained in accordance with JIS B 0601 (1994), and core roughness depth, reduced peak height, and reduced valley depth respectively are values obtained in accordance with DIN (Deutsche Industrie Norm) 4776, individually.

Here, by setting the value of ten-point average roughness (Rz) to be 0.8 µm or less, the aggressiveness toward the counterpart is reduced and scuffing resistance can be improved. If it exceeds 0.8 µm, the aggressiveness toward the counterpart becomes large. For these reasons, it is desirable that the ten-point average roughness (Rz) is 0.8 µm or less, and it is particularly desirable that it is in the range of 0.2 to 0.6 µm.

Further, by setting the reduced peak height (Rpk) to be 0.15 µm or less, the aggressiveness toward the cylinder liner (aggressiveness toward the counterpart) can be reduced.

Concerning a manufacturing method of a piston ring having this surface roughness of an outer circumference sliding surface, there is no limitation. For example, a method where lapping is given several times and fine abrasive grains are used for the lap for finishing step can be mentioned. In addition, buffing may be added as needed.

(Surface Coating Process of Piston Ring)

In the above-mentioned piston ring which is used for the combination of the present invention, a DLC (diamond-like carbon) coating may be applied on the surface, more specifically, an outer circumference sliding surface of the piston ring in contact with the cylinder liner.

As mentioned above, although the contact pressure between the piston ring and the cylinder liner is generally in the range of about 0.03 to 1.2 Mpa, but if a fine unevenness is provided on the piston ring or the cylinder liner in view of wear resistance (In the combination of the present invention, the fine unevenness is provided by carbides, etc.), a pressure of about 100 to 1000 times as much as the above mentioned contact pressure may be sometimes applied locally. Under such circumstances, it will cause easily to enter the boundary-lubrication region, which is followed by the absence of an oil film, i.e., the so-called "metal to metal contacting condition" that the piston ring and the cylinder liner come in contact directly with each other, and thus it would be considered that silicon particles are chipped under the condition and surfaces of both are damaged. Here, by forming a DLC (diamond-like carbon) coating on a surface of a piston ring, the fitting of the piston ring and the cylinder liner, particularly, that in early stage of sliding, can be improved.

As a composition of such DLC (diamond-like carbon) coating, for example, coatings comprising amorphous carbon (a-C), hydrogen (H), tungsten (W) and Nickel (Ni), and coatings comprising amorphous carbon (a-C), hydrogen (H) and silicon (Si), etc., can be enumerated, but the composition is not particularly limited thereto.

In addition, with respect to the hardness of a DLC (diamond-like carbon) coating, although there is no particular limitation, about 1000 Hv 0.1 to about 2500 Hv 0.1 is desirable, for instance.

In the case of being less than 1000 Hv 0.1, wear resistance becomes worse, while in the case of exceeding 2500 Hv 0.1, the stress of coated film becomes high and the detachment of the film may occur.

Furthermore, there is no limitation about the thickness of the DLC (diamond-like carbon) coating. As mentioned above, however, since the piston ring used for the combination of the present invention is characterized by the parameters of surface roughness (Rz and Rpk), it is necessary for the piston ring to be thick enough to maintain individual values of the surface roughness parameters (thick enough to be able to maintain a surface roughness of a piston ring) Concretely, with respect to the thickness of DLC, about 0.5 to 10.0 µm is desirable and about 0.5 to 5.0 µm is particularly desirable.

Further, as mentioned above, since the DLC (diamond-like carbon) coating is formed so thin as to maintain a surface roughness of a piston ring, it would be considered that the DLC coating disappears by wearing when the piston ring continues to slide on the cylinder liner. However, there is no problem even if it is wasted because the DLC (diamond-like carbon) coating is designed to improve the fitting of the piston ring and the cylinder liner in an early stage of sliding.

There is no limitation about a formation method of such DLC (diamond-like carbon) coating, and it is possible to select any known method optimally. Concretely, for example, a reactive sputtering method in which the respective component elements are used as targets can be mentioned.

EXAMPLE

A combination of a cylinder liner and piston rings according to the present invention will be concretely described by using examples.

<Examples for Contact Pressure of 0.2 to 1.2 Mpa>

Examples 1 to 5

First, as specimens of cylinder liners which each constitutes the combination according to the present invention, test pieces composed of Si: 25% by weight, Mg: 1.2% by weight, Cu: 3.9% by weight, Fe: 0.12% by weight, Ni: 0.008% by weight, Mn: 0.007% by weight, Zn: 0.008% by weight, and the rest: unavoidable impurities and Al were prepared. Then, surface roughness (Rz, Rpk, Rk, Rvk) of each test piece of the cylinder liner was varied as shown in the following Table 1 so that the individual test pieces became a specimen of the cylinder liner of individual Examples 1 to 15 according to the present invention.

On the other hand, as specimens of piston rings which each constitutes the combination according the present invention, test pieces composed of C, 0.33% by weight, Si: 0.05% by weight, Mn: 0.05% by weight, Ni: 0.20% by weight, Cr: 13.0% by weight, P: 0.02% by weight, S: 0.01% by weight, and the rest: unavoidable impurities and Fe were prepared. Then, surface roughness (Rz, Rpk) of each test piece of the piston ring and the area ratio of carbide (diameter: 0.1 to 1.5 µm) were varied as shown in the following Table 1 so that the individual test pieces became a specimen of the piston ring of individual Examples 1 to 15 according to the present invention. Further, onto the outer circumference sliding surface of each specimen of the piston ring, a nitride layer of 55 µm was formed by gas nitriding under condition of maintaining for 1 to 1.5 hours at 550° C., and the compound layer was removed in order to expose the diffusion layer. Then, the specimens were divided into those forming a DLC (diamond-like carbon) coating and those not forming a DLC coating. As shown in Table 1, a total of three kinds of specimens were prepared including those not formed with a DLC (diamond-like carbon) coating, and two kinds of those formed with a DLC coating of which component composition was mutually different between the two.

Incidentally, the DLC coating composed of a-C:H:W:Ni shown in Table 1 was formed in the following method.

A specimen of the piston ring was set to an attachment jig in a chamber of a reactive sputtering device, and the chamber was vacuumed. Then, while rotating the attachment jig, an inert gas such as argon was introduced and the surface of the specimen of the piston ring was purged by ion bombardment. Then, at first, by sputtering a Cr target with ionized argon or the like, Cr atoms thus evaporated in the chamber was deposited at about 1 µm on the specimen of the piston ring, and next, a hydrocarbon gas such as methane which was a carbon source was introduced into the chamber, and a metal target containing W was sputtered by an ionized argon or the like, in order to provide couplings between carbon atoms presented in the chamber and the evaporated metal atoms, and deposit a coating containing at least W on the specimen of the piston ring, and thus a DLC film with an excellent initial fitting was formed. A content ratio of W was controlled by adjusting evaporation rates of those elements and the pressure of the reactive gas, etc. The sputtering of the metal target by ionized argon or the like was performed for about 5 hours, and the thickness of the DLC film was set to be 5 µl. Further, the hardness of this DLC coating was 1500 Hv 0.1.

On the other hand, a DLC coating composed of a-C:H:Si shown in Table 1 was formed in the following method.

A specimen of a piston ring was set to an attachment jig in a chamber of a sputtering device, and the chamber was vacuumed. Then, while rotating an attachment jig, an inert gas such as argon was introduced and the surface of the specimen of the piston ring was purged by an ion bombardment. Then, first, by sputtering a Cr target with ionized argon or the like, Cr atoms thus evaporated in a chamber was deposited about 1 µm on the base material 1 of the piston ring. Then, a plasma CVD process was put into practice. In according to the plasma CVD method, by successively conducting a step in which the specimen to which an asymmetric pulse voltage was applied was installed in a vacuum deposition chamber and a discharge cleaning was given to this base material by a mixed plasma of argon gas and hydrogen gas, and a step in which tetra methyl silane gas was introduced in order to form an amorphous silicon carbide film layer on the above mentioned base material, the coating was formed.

The plasma CVD process was executed for about 2 hours and the thickness of the DLC coating was set to be 5 µM. Further, a hardness of this DLC coating was 2500 Hv 0.1.

(Controls 1 to 9)

As controls for the present invention, some combinations of cylinder liners and piston rings were prepared.

Concretely, as specimens of a cylinder liners which each constitutes the combination of Control, test pieces of the same composition with those of above Examples were prepared. Then, surface roughness (Rz, Rpk, Rk, Rvk) of each test piece of the cylinder liner was varied as shown in the following Table 1 so that the individual test pieces became a specimen of the cylinder liner of individual Controls 1 to 9.

On the other hand, as specimens of piston rings which each constitutes the combination of Control, test pieces of the same composition with those of above Examples were prepared. Then, surface roughness (Rz, Rpk) of each test piece of the piston ring and the area ratio of carbide (diameter: 0.1 to 1.5 µm) were varied as shown in the following Table 1 so that the individual test pieces became a specimen of the piston ring of individual Controls 1 to 9. Further, as in the case of above Examples, onto the outer circumference sliding surface of each specimen of the piston ring, a nitride layer of 55 m was formed by gas nitriding under condition of maintaining for 1 to 1.5 hours at 550° C., and the compound layer was removed in order to expose the diffusion layer. Then, the specimens were divided into those forming a DLC (diamond-like carbon) coating and those not forming a DLC coating. As shown in Table 1, a total of three kinds of specimens were prepared including those not formed with a DLC (diamond-like carbon) coating, and two kinds of those formed with a DLC coating of which component composition was mutually different between the two. The method for forming the coating is the same as the above-mentioned example.

Conventional Examples 1 to 3

A few combinations of cylinder liners and a piston rings were prepared as Conventional Examples.

Concretely, as specimens of a cylinder liners which each constitutes the combination of Conventional Example, test pieces of the same composition with those of above Examples were prepared. Then, surface roughness (Rz, Rpk, Rk, Rvk) of each test piece of the cylinder liner was varied as shown in the following Table 1 so that the individual test pieces became a specimen of the cylinder liner of individual Conventional Examples 1 to 3.

On the other hand, as specimens of piston rings which each constitutes the combination of Conventional Example, test pieces of the same composition with those of above Examples were prepared. Then, surface roughness (Rz, Rpk) of each test piece of the piston ring and the area ratio of carbide (diameter: 0.1 to 1.5 μm) were varied as shown in the following Table 1 so that the individual test pieces became a specimen of the piston ring of individual Conventional Examples 1 to 3. Further, as in the case of above Examples, onto the outer circumference sliding surface of each specimen of the piston ring, a nitride layer of 55 μm was formed by gas nitriding under condition of maintaining for 1 to 1.5 hours at 550° C., and the compound layer was removed in order to expose the diffusion layer. Then, the specimens were divided into those forming a DLC (diamond-like carbon) coating and those not forming a DLC coating. As shown in Table 1, a total of three kinds of specimens were prepared including those not formed with a DLC (diamond-like carbon) coating, and two kinds of those formed with a DLC coating of which component composition was mutually different between the two. The method for forming the coating is the same as the above-mentioned example.

(Evaluation)

With respect to the combinations of cylinder liners and piston rings of the above-mentioned Examples 1 to 15, Controls 1 to 9 and Conventional Examples 1 to 3, wear resistance and scuffing resistance were evaluated. The results are shown in Table 1.

Figure 2:
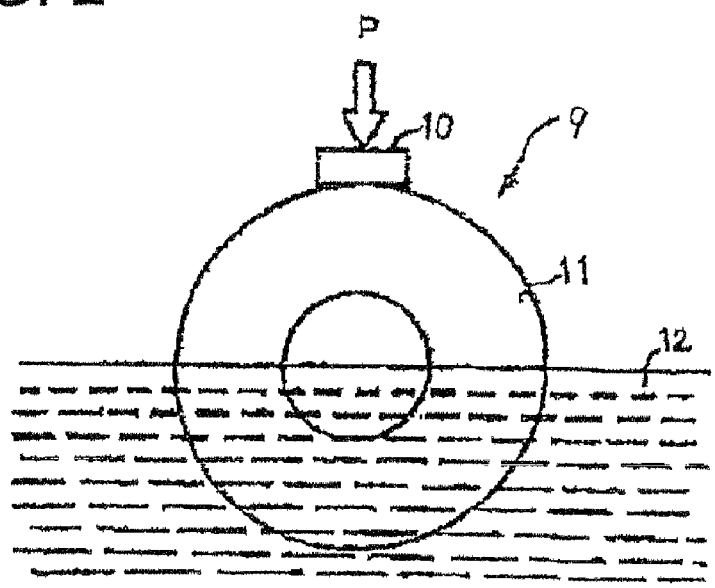
FIG. 2 is a view illustrating an evaluation test using an Amsler-type wearing tester.

Here, an Amsler-type wearing tester 9 shown in FIG. 2 was used for an anti-wear test. In this anti-wearing tester 9, a test was conducted in a way that each specimen 10 (8 mm×7 mm×5 mm) of the piston ring for Examples 1 to 15 of the present invention, Controls 1 to 9 and Conventional examples 1 to 3 was set as a fixed piece, and as each specimen 11 (rotation piece) of the cylinder liner of the corresponding one, a toroidal (external diameter 40 mm, inner diameter 16 mm, thickness 1 mm) one was used. These specimen 10 and 11 were contacted to each other, a load P was applied. Abrasion coefficient test was conducted under conditions of lubricant oil: bearing oil, oil temperature: 80° C., circumferential velocity: 1 m/sec (478 rpm), load: 80 kgf, test time: 7 hours. Further, amount of wear (μm) was determined by measuring profile of difference in level by a roughness gauge.

Abrasion index shown in Table 1 is a value calculated as a relative ratio of the amount of wear of each specimen of Examples 1 to 15, and of each specimen of Controls 1 to 9 to that of each specimen of Conventional Examples 1 to 3 Accordingly, this shows that the smaller than 100 the abrasion index of each material tested is, the less the amount of wear is and the more excellent the wear resistance is.

In addition, the Amsler-type wear tester shown in FIG. 2 was also used for the scuffing test. In the scuffing test, a test was conducted in a way that lubricant oil was attached to each of the specimen and a load was applied until occurrence of scuffing. The test was conducted under conditions of lubricant oil: CLESAF H8 (corresponding to No. 1 spindle oil), and circumferential velocity: 1 m/sec (478 rpm).

Scuffing resistance was expressed by scuffing index which is a relative ratio of the scuffing generating load of each specimen of Examples 1 to 15, and of each specimen of Controls 1 to 9 to that of each specimen of Conventional Examples 1 to 3 assuming that the scuffing generating load of each specimen of Conventional Examples 1 to 3 was 100. Accordingly, this shows that the larger than 100 the scuffing index of each specimen is, the greater the scuffing resistance is and the more excellent the scuffing resistance is as compared with that of the conventional specimen.

TABLE 1

| | Surface roughness of inner circumference surface of cylinder liner | | | | Surface roughness of outer circumference sliding surface of piston ring | | | | Evaluation result | | |
|---|---|---|---|---|---|---|---|---|---|---|---|
| | Rz (μm) | Rpk (μm) | Rk (μm) | Rvk (μm) | Rz (μm) | Rpk (μm) | Area ratio (%) | DLC coating component element | Abrasion index of cylinder liner | Abrasion index of piston ring | Anti-scuffing index |
| Example 1 | 0.50 | 0.052 | 0.20 | 0.088 | 0.21 | 0.02 | 4.0 | — | 92 | 93 | 112 |
| Example 2 | 0.52 | 0.052 | 0.23 | 0.082 | 0.61 | 0.09 | 4.4 | — | 93 | 94 | 110 |
| Example 3 | 0.51 | 0.050 | 0.21 | 0.080 | 0.79 | 0.14 | 4.8 | — | 95 | 95 | 105 |
| Example 4 | 0.98 | 0.098 | 0.38 | 0.185 | 0.62 | 0.09 | 5.5 | — | 96 | 94 | 105 |
| Example 5 | 0.94 | 0.100 | 0.40 | 0.200 | 0.78 | 0.14 | 4.4 | — | 97 | 95 | 106 |
| Example 6 | 0.51 | 0.052 | 0.20 | 0.089 | 0.22 | 0.03 | 4.1 | a-C:H:W:Ni | 90 | 91 | 114 |
| Example 7 | 0.51 | 0.051 | 0.21 | 0.082 | 0.63 | 0.09 | 4.5 | a-C:H:W:Ni | 91 | 92 | 112 |
| Example 8 | 0.52 | 0.052 | 0.22 | 0.081 | 0.76 | 0.14 | 4.8 | a-C:H:W:Ni | 93 | 93 | 107 |
| Example 9 | 0.96 | 0.098 | 0.38 | 0.187 | 0.62 | 0.08 | 5.4 | a-C:H:W:Ni | 94 | 92 | 107 |
| Example 10 | 0.94 | 0.098 | 0.40 | 0.199 | 0.79 | 0.15 | 4.5 | a-C:H:W:Ni | 95 | 93 | 108 |
| Example 11 | 0.52 | 0.051 | 0.23 | 0.085 | 0.22 | 0.02 | 4.1 | a-C:H:Si | 90 | 90 | 115 |
| Example 12 | 0.52 | 0.052 | 0.23 | 0.081 | 0.60 | 0.1 | 4.4 | a-C:H:Si | 91 | 91 | 112 |
| Example 13 | 0.50 | 0.050 | 0.20 | 0.082 | 0.78 | 0.14 | 4.7 | a-C:H:Si | 92 | 93 | 107 |
| Example 14 | 0.99 | 0.097 | 0.39 | 0.187 | 0.62 | 0.09 | 5.6 | a-C:H:Si | 93 | 92 | 107 |
| Example 15 | 0.95 | 0.100 | 0.41 | 0.185 | 0.78 | 0.14 | 4.5 | a-C:H:Si | 94 | 93 | 107 |
| Control 1 | 0.51 | 0.052 | 0.22 | 0.084 | 0.92 | 0.16 | 4.2 | — | 97 | 98 | 104 |
| Control 2 | 1.28 | 0.11 | 0.41 | 0.215 | 0.78 | 0.14 | 4.3 | — | 98 | 97 | 103 |
| Control 3 | 1.60 | 0.12 | 0.46 | 0.261 | 0.91 | 0.16 | 4.5 | — | 100 | 100 | 101 |
| Control 4 | 0.52 | 0.052 | 0.23 | 0.085 | 0.93 | 0.16 | 4.0 | a-C:H:W:Ni | 96 | 97 | 105 |
| Control 5 | 1.25 | 0.09 | 0.41 | 0.212 | 0.79 | 0.14 | 4.5 | a-C:H:W:Ni | 97 | 96 | 104 |
| Control 6 | 1.57 | 0.10 | 0.43 | 0.262 | 0.93 | 0.18 | 4.7 | a-C:H:W:Ni | 99 | 100 | 101 |
| Control 7 | 0.52 | 0.053 | 0.22 | 0.086 | 0.94 | 0.17 | 4.3 | a-C:H:Si | 97 | 97 | 104 |

TABLE 1-continued

| | Surface roughness of inner circumference surface of cylinder liner | | | | Surface roughness of outer circumference sliding surface of piston ring | | | DLC coating component element | Evaluation result | | |
| --- | --- | --- | --- | --- | --- | --- | --- | --- | --- | --- | --- |
| | Rz (µm) | Rpk (µm) | Rk (µm) | Rvk (µm) | Rz (µm) | Rpk (µm) | Area ratio (%) | | Abrasion index of cylinder liner | Abrasion index of piston ring | Anti-scuffing index |
| Control 8 | 1.3 | 0.13 | 0.43 | 0.220 | 0.77 | 0.13 | 4.5 | a-C:H:Si | 96 | 96 | 104 |
| Control 9 | 1.59 | 0.11 | 0.45 | 0.260 | 0.92 | 0.17 | 4.8 | a-C:H:Si | 100 | 99 | 101 |
| Conventional Example 1 | 2.12 | 0.16 | 0.063 | 0.36 | 0.64 | 0.11 | 4.2 | — | 100 | 100 | 100 |
| Conventional Example 2 | 2.12 | 0.16 | 0.063 | 0.36 | 0.64 | 0.11 | 4.2 | a-C:H:W:Ni | 100 | 100 | 100 |
| Conventional Example 3 | 2.08 | 0.17 | 0.065 | 0.35 | 0.62 | 0.1 | 4.0 | a-C:H:Si | 100 | 100 | 100 |

<Examples for Contact Pressure of 0.03 to 0.2 Mpa>

Examples 16 to 27

As specimens of cylinder liners which each constitutes the combination according to the present invention, test pieces composed of composed of C, 0.65% by weight, Si: 0.40% by weight, Mn: 0.35% by weight, Cr: 13.5% by weight, Mo: 0.30% by weight, P: 0.02% by weight, S: 0.01% by weight, and the rest: unavoidable impurities and Fe were prepared. Except that the test pieces were prepared by using such composition, combinations of cylinder liners and piston rings for Examples 16 to 27 shown in Table 2 were produced in the same manner as in Examples 1 to 15. Further, in test pieces of piston rings of Examples 16 to 27, the diameter of carbide was regulated to 0.1 to 2.0 µm.

(Controls 10 to 18)

In the same manner as in Controls 1 to 9, combinations of cylinder liners and piston rings for Controls 10 to 18 shown in Table 2 were prepared. Further, in test pieces of piston rings of Controls 10 to 18, the diameter of carbide was regulated to 0.1 to 2.0 µm.

Conventional Examples 4 to 6

Furthermore, in the same manner as in Conventional Examples 1 to 3, combinations of cylinder liners and piston rings for Conventional Examples 4 to 6 shown in Table 2 were prepared. Further, in test pieces of piston rings of Conventional Examples 4 to 6, the diameter of carbide were regulated to 0.1 to 2.0 µm.

(Evaluation)

With respect to the combinations of cylinder liners and piston rings of the abovementioned Examples 16 to 27, Controls 10 to 18 and Conventional Examples 4 to 6, wear resistance and scuffing resistance were evaluated by using Amsler-type wear tester and under the same condition as above except that the load was set to 100 kgf. The results are shown in Table 2.

Abrasion index shown in Table 2 is a value calculated as a relative ratio of the amount of wear of each specimen of Examples 16 to 27, and of each specimen of Controls 10 to 18 to that of each specimen of Conventional Examples 4 to 6. Accordingly, this shows that the smaller than 100 the abrasion index of each material tested is, the less the amount of wear is and the more excellent the wear resistance is.

In addition, scuffing resistance was expressed by scuffing index which is a relative ratio of the scuffing generating load of each specimen of Examples 16 to 27, and of each specimen of Controls 10 to 18 to that of each specimen of Conventional Examples 4 to 6 assuming that the scuffing generating load of each specimen of Conventional Examples 1 to 3 was 100. Accordingly, this shows that the larger than 100 the e scuffing index of each specimen is, the greater the scuffing resistance is and the more excellent the scuffing resistance is as compared with that of the conventional specimen.

TABLE 2

| | Surface roughness of inner circumference surface of cylinder liner | | | | Surface roughness of outer circumference sliding surface of piston ring | | | DLC coating component element | Evaluation result | | |
| --- | --- | --- | --- | --- | --- | --- | --- | --- | --- | --- | --- |
| | Rz (µm) | Rpk (µm) | Rk (µm) | Rvk (µm) | Rz (µm) | Rpk (µm) | Area ratio (%) | | Abrasion index of a cylinder liner | Abrasion index of a piston ring | Anti-scuffing index |
| Example 16 | 0.51 | 0.052 | 0.21 | 0.082 | 0.58 | 0.09 | 8.5 | — | 93 | 92 | 109 |
| Example 17 | 0.86 | 0.081 | 0.34 | 0.136 | 0.22 | 0.02 | 9.0 | — | 94 | 93 | 109 |
| Example 18 | 0.88 | 0.090 | 0.36 | 0.148 | 0.80 | 0.14 | 6.1 | — | 95 | 96 | 106 |
| Example 19 | 1.00 | 0.097 | 0.39 | 0.195 | 0.21 | 0.02 | 7.3 | — | 95 | 94 | 107 |
| Example 20 | 0.52 | 0.051 | 0.20 | 0.081 | 0.57 | 0.08 | 8.2 | a-C:H:W:Ni | 91 | 90 | 112 |
| Example 21 | 0.85 | 0.083 | 0.35 | 0.138 | 0.25 | 0.04 | 8.7 | a-C:H:W:Ni | 92 | 91 | 111 |
| Example 22 | 0.89 | 0.091 | 0.38 | 0.151 | 0.82 | 0.15 | 6.3 | a-C:H:W:Ni | 93 | 93 | 108 |
| Example 23 | 0.99 | 0.095 | 0.39 | 0.193 | 0.22 | 0.02 | 7.1 | a-C:H:W:Ni | 93 | 92 | 109 |
| Example 24 | 0.52 | 0.052 | 0.22 | 0.081 | 0.23 | 0.03 | 9.1 | a-C:H:Si | 91 | 91 | 111 |
| Example 25 | 0.85 | 0.083 | 0.34 | 0.138 | 0.56 | 0.11 | 8.7 | a-C:H:Si | 92 | 91 | 110 |
| Example 26 | 0.88 | 0.091 | 0.35 | 0.149 | 0.81 | 0.14 | 6.0 | a-C:H:Si | 92 | 93 | 108 |
| Example 27 | 1.00 | 0.098 | 0.39 | 0.197 | 0.22 | 0.02 | 7.4 | a-C:H:Si | 93 | 92 | 108 |

TABLE 2-continued

| | Surface roughness of inner circumference surface of cylinder liner | | | | Surface roughness of outer circumference sliding surface of piston ring | | | DLC coating component element | Evaluation result | | Anti-scuffing index |
|---|---|---|---|---|---|---|---|---|---|---|---|
| | Rz (μm) | Rpk (μm) | Rk (μm) | Rvk (μm) | Rz (μm) | Rpk (μm) | Area ratio (%) | | Abrasion index of a cylinder liner | Abrasion index of a piston ring | |
| Control 10 | 0.51 | 0.051 | 0.23 | 0.083 | 0.89 | 0.16 | 7.6 | — | 98 | 98 | 104 |
| Control 11 | 1.05 | 0.12 | 0.42 | 0.222 | 0.22 | 0.02 | 8.1 | — | 98 | 96 | 103 |
| Control 12 | 1.10 | 0.13 | 0.45 | 0.241 | 0.62 | 0.09 | 8.5 | — | 96 | 98 | 102 |
| Control 13 | 0.51 | 0.051 | 0.22 | 0.085 | 0.93 | 0.16 | 8.1 | a-C:H:W:Ni | 96 | 97 | 105 |
| Control 14 | 1.03 | 0.11 | 0.42 | 0.224 | 0.23 | 0.03 | 8.4 | a-C:H:W:Ni | 98 | 96 | 103 |
| Control 15 | 1.11 | 0.14 | 0.44 | 0.239 | 0.59 | 0.07 | 8.1 | a-C:H:W:Ni | 96 | 98 | 102 |
| Control 16 | 0.52 | 0.052 | 0.23 | 0.085 | 0.92 | 0.18 | 8.5 | a-C:H:Si | 97 | 97 | 104 |
| Control 17 | 1.03 | 0.11 | 0.41 | 0.221 | 0.22 | 0.03 | 7.8 | a-C:H:Si | 99 | 97 | 102 |
| Control 18 | 1.09 | 0.13 | 0.45 | 0.24 | 0.60 | 0.08 | 8.6 | a-C:H:Si | 97 | 98 | 102 |
| Conventional Example 4 | 2.1 | 0.13 | 0.60 | 0.33 | 0.63 | 0.11 | 7.4 | — | 100 | 100 | 100 |
| Conventional Example 5 | 2.1 | 0.13 | 0.60 | 0.33 | 0.63 | 0.11 | 7.4 | a-C:H:W:Ni | 100 | 100 | 100 |
| Conventional Example 6 | 2.11 | 0.15 | 0.62 | 0.35 | 0.61 | 0.13 | 7.9 | a-C:H:Si | 100 | 100 | 100 |

As clear from Table 1 and 2, it turns out that, in contrast to Conventional Examples, the each amount of wear of the cylinder liner and the piston ring is reduced if the surface roughness of the inner circumference surface of the cylinder liner is within the range of the present invention and the piston ring of the present invention is also within the range of the present invention. In addition, it turns out that by forming DLC on the outer circumference sliding surface of the piston ring, the amounts of wear of both parts can be further reduced and the scuffing resistance can be further improved.

<Actual Equipment Test>

With respect to a combination of piston rings and a cylinder liner shown in FIG. 1, an endurance test was conducted on a 3.0 L, V6 type automobile gasoline engine.

With respect to each second pressure ring and each spacer expander of each oil ring, the materials thereof were common to all of the cylinders, and with respect to each first pressure ring and the side-rails of each oil ring, the materials thereof and the surface roughness of outer circumference sliding surface thereof were varied every cylinders, and thereby, the amount of wear and external appearance for each first pressure ring and the side-rails of each oil ring were determined.

Incidentally, the contact pressure applied to each first ring was set to 0.14 MPa, and the contact pressure applied to each side-rail of the oil rings was set to 0.7 MPa.

With respect to the first cylinder, as a cylinder liner thereof a cylinder liner of which specifications was those of the above-mentioned Conventional Example 3 was used, and as the piston rings thereof, a first pressure ring of which specifications was that of the above-mentioned Conventional Example 4 and a oil ring of which side-rails had the specifications of the above-mentioned Conventional Example 1 were used in combination. With respect to the second cylinder, as a cylinder liner thereof a cylinder liner of which specifications was those of the above-mentioned Example 16 was used, and as the piston rings thereof, a first pressure ring of which specifications was that of the above-mentioned Example 16 and a oil ring of which side-rails had the specifications of the above Example 1 were used in combination. With respect to the third cylinder, as a cylinder liner thereof a cylinder liner of which specifications was those of the above-mentioned Example 20 was used, and as the piston rings thereof, a first pressure ring of which specifications was that of the above-mentioned Example 20 and a oil ring of which side-rails had the specifications of the above mentioned Example 6 were used in combination. With respect to the fourth cylinder, as a cylinder liner thereof a cylinder liner of which specifications was those of the above-mentioned Example 17 was used, and as the piston rings thereof, a first pressure ring of which specifications was that of the above-mentioned Example 17 and a oil ring of which side-rails had the specifications of the above mentioned Example 17 were used in combination. With respect to the fifth cylinder, as a cylinder liner thereof a cylinder liner of which specifications was those of the above-mentioned Example 24 was used, and as the piston rings thereof, a first pressure ring of which specifications was that of the above-mentioned Example 24 and a oil ring of which side-rails had the specifications of the above mentioned Example 11 were used in combination. With respect to the sixth cylinder, as a cylinder liner thereof a cylinder liner of which specifications was those of the above-mentioned Example 5 was used, and as the piston rings thereof, a first pressure ring of which specifications was that of the above-mentioned Example 5 and a oil ring of which side-rails had the specifications of the above mentioned Example 5 were used in combination.

Assuming that each individual amount of wear of the first pressure ring, the side-rails and the cylinder liner in the first cylinder of Conventional Example was to be 100, in a second cylinder, the amount of wear of the first pressure ring was 92, that of the side-rails was 93 and that of the cylinder liner was 93. Similarly, in the third cylinder, the amount of wear of the first pressure ring was 90, that of the side-rails was 91 and that of the cylinder liner was 92, in the fourth cylinder, the amount of wear of the first pressure ring is 95, that of the side-rails was 96 and that of the cylinder liner is 110, in the fifth cylinder, the amount of wear of the first pressure ring was 91, that of the side-rails was 91 and that of the cylinder liner was 92, and in the sixth cylinder, the amount of wear of the first pressure ring was 110, that of the side-rails was 93 and that of the cylinder liner was 94.

As described above, it turns out that the second and third cylinders fitted with parts according to the present invention show improvements of 5% or more in the wear amount ratio, and that the third and a fifth cylinders wherein the DLC coating was applied show improvements of 8% or more in the wear amount ratio both for the piston rings and for the cylinder liner. In the forth cylinder in which the first pressure ring and the side-rails which have specifications of Example 17 were used, a circumferential surface flaw was observed on a cylinder liner inner circumference surface, and in the sixth cylinder in which the first pressure ring and the side-rails which have specifications of Example 5 were used, the amount of wear of the first pressure ring increased although the circumferential surface flaw was not observed on a cylinder liner inner circumference surface. As is evident from these results, the material for the piston ring should be varied in accordance with the contact pressure to be applied.

As described above, by setting the inner circumference surface of the cylinder liner and the outer circumference sliding surface of each piston ring within the respective ranges according to the present invention, the wear resistance can be improved and, furthermore, by applying a DLC coating to the piston ring, more preferable effects can be expected.

What is claimed is:

1. A combination of a cylinder liner used for an internal-combustion engine and a piston ring which slides on an inner circumference surface of the cylinder liner at the pressure of 0.03 to 0.2 MPa,
   wherein the composition of the cylinder liner comprises,
      (Composition A) silicon: 23.0 to 23.0% by weight, magnesium: 0.80 to 2.0% by weight, copper: 3.0 to 4.5% by weight, iron: 0.25% by weight or less, nickel: 0.01% by weight or less, and the rest: unavoidable impurities and aluminum, or (Composition B) silicon: 23.0 to 28.0% by weight, magnesium: 0.80 to 2.0% by weight, copper: 3.0 to 4,5% by weight, iron: 1.0 to 1.4% by weight, nickel: 1.0 to 5.0% by weight, and the rest: any of avoidable impurities and aluminum;
   wherein surface roughness profile of the inner circumference surface of the cylinder liner has, a ten-point average roughness Rz=0.5 to 1.0 μm according to JIS B 0601 (1994), a core roughness depth Rk=0.2 to 0.4 μm according to DIN4776 standards, a reduced peak height Rpk=0.05 to 0.1 μm according to DIN 4776, a reduced valley depth Rvk=0.08 to 0.2 according to DIN 4776;
   meanwhile, wherein the composition of the piston ring comprises carbon: 0.6 to 0.7% by weight, chrome: 13 to 14% by weight, molybdenum: 0.2 to 0.4% by weight, silicon: 0.25 to 0.50% by weight, manganese: 0.2 to 0.5% by weight, and the rest: unavoidable impurities and iron; and
   the composition includes carbides with a diameter of 5.0 μm or less at the area rate of 4 to 10%, and
   the surface roughness profile of an outer circumference sliding surface of the piston ring has a ten-point average roughness Rz=0.8 μm or less according to JIS B 0601 (1994), and a reduced peak height Rpk=0.15 μm or less according to DIN 4776.

2. A cylinder liner used for an internal-combustion engine and a piston ring which slides on an inner circumference surface of the cylinder liner at the pressure of 0.2 to 1.2 MPa,
   wherein the composition of the cylinder liner comprises,
      (Composition A) silicon: 23.0 to 28.0% by weight, magnesium: 0.80 to 2.0% by weight, copper: 3.0 to 4.5% by weight, iron: 0.25% by weight or less, nickel: 0.01% by weight or less, and the rest: unavoidable impurities and aluminum, or
      (Composition B) silicon: 23.0 to 28.0% by weight, magnesium: 0.80 to 2.0% by weight, copper: 3.0 to 4.5% by weight, iron: 1.0 to 1.4% by weight, nickel: 1.0 to 5.0% by weight, and the rest: any of avoidable impurities and aluminum;
   wherein surface roughness profile of the inner circumference surface of the cylinder liner has, a ten-point average roughness Rz=0.5 to 1.0 μm according to JIS B 0601 (1994), a core roughness depth Rk=0.2 to 0.4 μm according to DIN 4776 standards, a reduced peak height Rpk=0.05 to 0.1 μm according to DIN 4776, a reduced valley depth Rvk=0.08 to 0.2;
   meanwhile, wherein the composition of the piston ring comprises carbon: 0.26 to 0.4% by weight, chrome: 12 to 14% by weight, nickel: 0.6 % or less by weight, silicon: 1.0% or less by weight, manganese: 1.0% or less by weight, and the rest: unavoidable impurities and iron, and
   the composition includes carbides with a diameter of 5.0 μm or less at the area rate of 4 to 10%, and
   the surface roughness profile of an outer circumference sliding surface of the piston ring has a ten-point average roughness Rz=0.8 μm or less according to JIS B 0601 (1994), and a reduced peak height Rpk=0.15 μm or less according to DIN 4776.

3. The combination of a cylinder liner and a piston ring according to claim 1, wherein a DLC (diamond-like carbon) coating is formed on the outer circumference sliding surface of the piston ring.

4. The combination of a cylinder liner and a piston ring according to claim 2, wherein a DLC (diamond-like carbon) coating is formed on the outer circumference sliding surface of the piston ring.

* * * * *